United States Patent
Grätzel et al.

[11] Patent Number: 5,728,487
[45] Date of Patent: Mar. 17, 1998

[54] PHOTOELECTROCHEMICAL CELL AND ELECTROLYTE FOR THIS CELL

[75] Inventors: Michael Grätzel, St-Sulpice; Yordan Athanassov, Prilly; Pierre Bonhote, Neuchâtel, all of Switzerland

[73] Assignee: Ecole Polytechnique Federale de Lausanne, Lausanne, Switzerland

[21] Appl. No.: 669,275

[22] PCT Filed: Dec. 28, 1994

[86] PCT No.: PCT/IB94/00445
§ 371 Date: Jun. 28, 1996
§ 102(e) Date: Jun. 28, 1996

[87] PCT Pub. No.: WO95/18456
PCT Pub. Date: Jul. 6, 1995

[30] Foreign Application Priority Data

Dec. 29, 1993 [CH] Switzerland .................. 3889/93

[51] Int. Cl.[6] .................. H01M 6/30; H01M 6/04
[52] U.S. Cl. .................. 429/111; 429/188; 429/194; 429/198; 429/199; 429/203
[58] Field of Search .................. 429/111, 188, 429/194, 198–199, 203

[56] References Cited

PUBLICATIONS

K. Rajeshwar et al., *Proceedings 16th ECEC*, Aug. 1981, pp. 779–782.

*Primary Examiner*—Aaron Weisstuch
*Attorney, Agent, or Firm*—Woodard, Emhardt, Naughton Moriarty & McNett

[57] ABSTRACT

A cell including a photoanode consisting of at least one polycrystalline titanium dioxide layer on a conductive substrate, a counter-electrode and an electrolyte positioned between these electrodes, at least one of said electrodes being transparent or translucent. The electrolyte includes an oxidation-reduction system which is liquid at room temperature. The first species of the pair making up the oxidation-reduction system advantageously consists of an electrochemically active salt having a melting point below room temperature, and optionally being dissolved in at least one electrochemically inactive salt also having a melting point below room temperature.

24 Claims, No Drawings

PHOTOELECTROCHEMICAL CELL AND ELECTROLYTE FOR THIS CELL

The invention concerns a regenerative photoelectrochemical cell comprising a photoanode consisting of at least one semi-conductive metal oxide layer on a conductive substrate, a counter-electrode and an electrolyte positioned between these electrodes, at least one of these electrodes being transparent or translucent, and the said electrolyte including an oxidation-reduction system consisting of at least one electrochemically active salt and at least one molecule designed to form an oxidation-reduction system with the anion or cation of the said salt.

In particular, the invention concerns a cell of this type in which the said semi-conductive metal oxide layer is polycrystalline, especially a cell in which this layer consists of nanocrystalline titanium dioxide $TiO_2$, sensitized by at least one chromophoric substance, the surface of the photoanode in contact with the electrolyte being porous, with a porosity factor of preferably at least 20.

The term "nanocrystalline" means that the semi-conductive metal oxide, in this case titanium oxide, is in polycrystalline form with a granulometry of the order of several nanometers, for example 10 to 50 nanometers.

The "porosity factor" is defined as the ratio of the photoelectrochemically active surface of the photoanode to the surface area of the substrate covered by the layer(s) of semi-conductive metal oxide.

Cells of this type are already known, especially that described in U.S. Pat. No. 4,927,721 and that described in international patent application WO 91/16719.

To date, liquid electrolytes have been used in this type of cell, comprising a solution with an oxidation-reduction system consisting of a mixture of at least one salt with a melting point higher than room temperature with at least one molecule corresponding to the anion of this salt, in a solvent or mixture of solvents, such as at least one polar organic solvent with a high dielectric constant, or in a high acidity aqueous medium.

For example, the oxidation-reduction system can consist of a solution of 0.5 M tetrapropylammonium iodide and 40 mM iodine and the solvent is a mixture of ethylene carbonate and acetonitrile.

It was found that regenerative photoelectrochemical cells using an electrolyte of the type mentioned above are likely to prove disadvantageous with regard to the nature and properties of such an electrolyte, with the following disadvantages in particular:

Due to the volatility of the solvents likely to be used for the electrolyte, if the electrolytic compartment is not perfectly leaktight, the solvent may evaporate thus preventing the cell from operating ("dead battery").

If the cell is operating at a temperature below room temperature, for example of the order of $-10°$ C. to $-30°$ C., the salt may precipitate in the form of a crystalline solid, which is manifested by an appreciable reduction in the performance of the cell at that temperature.

A progressive reduction in performance of the cell may also be found at a given constant temperature, such as room temperature, due to instability of the electrolyte, attributable to the breakdown of the solvents used or to spurious chemical reactions between the redox system constituents and the solvents.

Finally, if the solvent contains propylene or ethylene carbonate, substances may form in a gaseous state, such as carbon dioxide, again due to breakdown of the solvent or secondary reactions between this and the redox system elements, resulting not only in loss of performance of the cell but a risk of it exploding as well.

The present invention is in general designed to eliminate these disadvantages and more particularly improve the stability of the performance of the cell in the course of time, and as a function of operating temperature.

To this effect, the cell as per the invention is characterised in that the said electrochemically active salt has a melting point below room temperature or forms at least one phase with a melting point below room temperature, in presence of the second species of the said oxidation-reduction system.

The invention also covers an electrolyte for this cell.

According to a first embodiment of the electrolyte, this consists of a product obtained by adding a salt with a melting point below room temperature, or a mixture of several salts of this type, at least one molecular species or an element in neutral state forming a redox system with at least one ion of this salt or salts.

For example, the said ion is an iodide ion $I^-$ and the said element is the iodine.

According to one variant of this first embodiment, the first species of the couple forming the oxidation reduction system consists of at least one salt with a melting point lower than room temperature, and this salt is used in solution in at least one other salt, likewise with a melting point lower than room temperature, with only the first of the abovementioned salts being electrochemically active in the potential range of cell operation whereas the other salt is electrochemically inactive in this potential range.

According to another embodiment, the electrolyte consists, as the first species of a couple forming the oxidation reduction system, of at least one salt with a melting point above room temperature but forming a liquid phase at this same temperature in the presence of the second species of the said couple.

The electrolyte according to any of the embodiments or variants mentioned above can be used as it is or in diluted form in an appropriate liquid solvent, such as an aqueous medium or polar organic solvent, with a high dielectric constant, or a mixture of such solvents.

This results in the following advantages:

If electrolyte is used without a liquid solvent, the electrolyte has a very low vapour tension, which eliminates or minimises the risk of evaporation mentioned above with regard to former types of electrolyte.

Again, if the electrolyte does not contain any liquid solvents, the risk of reduced performance caused by precipitation of the crystalline salt(s) in electrolytic solutions of prior art types is eliminated.

If electrolyte diluted in a liquid solvent is used, any phase separation when the cell is operated at low temperature is reflected in the presence of two liquid phases each of which ensures operation of the cell, independently. Consequently, the performance of the cell is reduced to a far lesser degree than with the precipitation of crystalline salt noted in electrolytes known previously.

The proportion of solvent actually used is in fact well below that of previously known electrolytes, which is a contributory factor to the improvement in the stability of the electrolyte.

A salt selected from those with a cation consisting of one or more groups comprising at least one atom of quaternary nitrogen and those with a cation consisting of one or more groups comprising a ternary sulphur atom or a quaternary phosphorous atom, can be used as a salt with a melting point below room temperature.

The said cation can in fact be selected from imidazolium type groups with the following general formula:

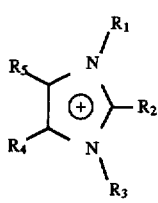

where the groups $R_1$, $R_2$, $R_3$, $R_4$, and $R_5$ are identical or different and are selected from hydrogen and linear or branched alkyl groups, with 1 to 20 atoms of carbon, linear or branched alkoxy groups with 1 to 20 atoms of carbon, fluoride substitution derivatives of alkyl groups having 1 to 20 atoms of carbon, alkenyl groups, alkinyl groups, and combinations of these groups and the corresponding halogenides, or from the alkoxyalkyl and polyether groups.

The cation may likewise be selected from the triazolium or phosphonium type groups, corresponding to the following general formulae, respectively:

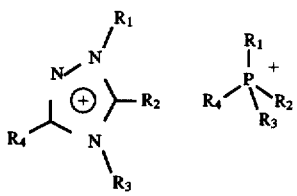

in which groups $R_1$, $R_2$, $R_3$, and $R_4$ have the same meanings as detailed above.

The cation may also be selected from groups with the following general formula:

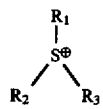

in which the groups $R_1$, $R_2$, and $R_3$ have the same meanings as detailed above.

It should be noted that the groups described above are not limitative.

Mixtures or combinations containing at least two salts of this type can likewise be used, or mixtures or combinations, liquid at room temperature, of at least one salt of this type with at least one salt which crystallizes at room temperature. Mixtures with an electrochemically active salt of relatively high viscosity can in particular be used, with at least one more fluid salt, that is electrochemically inert, or solutions of an electrochemically active salt, with a melting point higher than room temperature in at least one salt that is electrochemically inert and is liquid at this temperature.

The anion associated with one or more appropriate cations, in electrochemically active salts with a melting point below room temperature may in particular consist of a halogenide ion, more particularly a chloride, iodide or bromide, or a polyhalogenide ion, or again a complex anion containing at least one halogenide ion.

In particular, this polyhalogenide ion can be an ion obtained by the addition of a given quantity of corresponding halogen to a halogenide.

The anion associated with one or more cations, in electrochemically inactive salts with a melting point lower than room temperature, can in particular be selected from perfluoroalkane sulphonate types, such as the trifluoromethane sulphonate ion $CF_3SO_3^-$, or those of perfluoroalkanoate type, such as the trifluoroacetate ion $CF_3COO^-$ and those of tris-(perfluoroalkane sulphone) carbide type, such as the tris-(trifluoromethane sulphone) carbide ion $(CF_3SO_2)_3C^-$.

For example, the electrochemically active salt with a melting point below room temperature can be in the form of at least one of the following salts:

1-hexyl-3-methylimidazolium iodide
1-pentyl-3-methylimidazolium iodide
1-butyl-3-methylimidazolium iodide
1-isobutyl-3-methylimidazolium iodide
1-hexyl-3-vinylimidazolium iodide
3-methyl-1-pentylimidazolium bromide
1-heptyl-3methylimidazolium bromide At least one of the following salts can be used as an electrochemically inactive salt with a melting point lower than room temperature:

1-ethyl 3-methylimidazolium trifluoromethane sulphonate
1-butyl 3-methylimidazolium trifluoromethane sulphonate
1,3 -dimethylimidazolium trifluoroacetate
1-ethyl 3-methylimidazolium trifluoroacetate
1-butyl 3-methylimidazolium trifluoroacetate
1,3-diethylimidazolium trifluoroacetate
1-ethyl 3-butylimidazolium trifluoroacetate
1-ethyl 3-methylimidazolium perfluorobutanoate
1-butyl 3-methylimidazolium perfluorobutanoate As a solvent where required for creating a solution of the mixture of at least one salt with a melting point below room temperature, with the said molecule or said element forming a redox system with the said salt or combination of salts, water or at least one organic solvent can be used, selected from the following: alcohol, especially ethanol and butanol; nitriles, especially acetonitrile and butyronitrile; tetramethylurea; heterocyclical compounds containing at least one atom of nitrogen and/or oxygen in the heterocycle, especially 3-methyl-2-oxazolidinone, 1,3-dimethyl -3, 4, 5, 6-tetrahydro-2(1H)-pyrimidone,1 -methyl-2-pyrolidone and dimethylimidazolidinone; dimethyl-sulphoxide; sulpholane; higher ketones (e.g. pentanone-3).

EXAMPLE 1

Redox system: 1-hexyl-3-methylimidazolium iodide/iodine.

The 1-hexyl-3-methylimidazolium is prepared by diluting 0,1 mol of 1-methylimidazole in 100 ml of 1,1,1-trichloroethane and then adding one drop at a time, stirring briskly, a solution of 0,1 mol of 1-iodohexane, freshly distilled, in 100 ml of 1,1,1-trichloroethane. The mixture thus obtained is then brought to reflux point for 2 hours. This creates 1-hexyl-3-methylimidazolium iodide in the form of an oily liquid product, insoluble in trichloroethane which is separated from the reagent medium by settling and washed twice with 50 ml of trichloroethane. Finally, the product is dried for 2 hours at 800 C. under pressure reduced to 0.2 mbar.

The redox system is then created by mixing 75 parts in weight of the oil thus obtained with 25 parts in weight of the iodine.

The product thus obtained is used as it is (without solvent) as an electrolyte in a regenerative photoelectrochemical cell with the following characteristics:

Surface area of electrodes: 0.24 cm$^2$

Characteristics of anode: film of 7 micrometers of titanium dioxide $TiO_2$ in the form of "nanoparticles" of granulometry 20 nm, sensitized by means of the complex $RuL_2SCN_2$ in which the symbol L represents the group 2,2'-bipyridyl-4-4'-dicarboxylate.

Characteristics of the counter-electrode: glass conductive to tin oxide $SnO_2$, covered with a transparent conductive layer of platinum.

The following results are obtained for illumination of the cell by sunlight of specific rating 1/10 sun (80 Watts/m$^2$) and a cell operating temperature of 20° C.:

open circuit current: 200 μA
open circuit voltage: 520 mV
Output: 4%

EXAMPLE 2

Electrolyte: mixture of 1 part volume of an initial redox system consisting of 95 parts in weight of 1-hexyl-3-methylimidazolium iodide and 5 parts in weight of iodine and 2 parts in volume of a second redox system consisting of a solution of 0.3 mol of lithium iodide LiI and 30 mmol of iodine in 3-methyl-2-oxazolidinone.

Using this mixture in solution in 3-methyl-2-oxazolidinone as an electrolyte in a regenerative photoelectrochemical cell with electrodes having the same characteristics as the cell in example 1, but with a surface area of 0.33 cm$^2$, illuminated by solar radiation, with a specific rating of 1/10 sun (80 Watts/m$^2$) and an operating temperature of 20° C., the following results are obtained:

open circuit current: 330 μA
open circuit voltage: 640 mV
Output: 7.8%

It was found that the performance of cells described in examples 1 and 2 is largely unchanged for an uninterrupted operating period at constant temperature of +25° C. for 60 days.

We claim:

1. A regenerative photoelectrochemical cell comprising a photoanode consisting of at least one semiconductive metal oxide layer on a conductive substrate, a counter-electrode and a liquid electrolyte positioned between these electrodes, at least one of these electrodes being transparent or translucent, and the said electrolyte including an oxidation-reduction system consisting of a mixture of at least one electrochemically active salt and at least one molecule designed to form an oxidation-reduction system with the anion or cation of the said salt, wherein said electrochemically active salt has a melting point below ambient temperature or forms in presence of said at least one molecule at least one phase with a melting point below ambient temperature.

2. A regenerative photoelectrochemical cell according to claim 1, wherein said semiconductive metal oxide layer is polycrystalline.

3. A regenerative photoelectrochemical cell according to claim 2, wherein the said semiconductive metal oxide layer consists of nanocrystalline titanium dioxide $TiO_2$, sensitized by at least one chromophoric substance.

4. A liquid electrolyte for a photoelectrochemical cell, said electrolyte comprising an oxidation reduction system consisting of a mixture of at least one electrochemically active salt and at least one molecule designed to form an oxidation reduction system with the anion or cation of said salt, wherein said electrochemically active salt has a melting point below ambient temperature or forms with said at least one molecule at least one phase having a melting point below ambient temperature.

5. An electrolyte according to claim 4, wherein said electrolyte comprises a mixture of at least one of said electrochemically active salt having a melting point below ambient temperature and said at least one molecule having also a melting point below ambient temperature.

6. An electrolyte according to claim 5, wherein the cation of said electrochemically active salt consists of at least one group comprising a ternary sulphur atom.

7. An electrolyte according to claim 5, wherein the cation of the said electrochemically active salt consists of at least one group comprising a quaternary phosphorous atom.

8. An electrolyte according to claim 7, wherein said group is a phosphonium group corresponding to the following general formula:

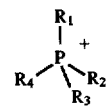

in which groups $R_1$, $R_2$, $R_3$, and $R_4$ have the same meanings as detailed in claim 14.

9. An electrolyte according to claim 5, wherein said electrochemically inactive salt having a melting point below ambient temperature comprises at least one cation as specified in one of claims 15 to 8 in combination with an anion selected from anions of the following types: perfluoroalkane sulphonate types, perfluoroalkanoate, and tris-(perfluoroalkanesulphone) carbides.

10. An electrolyte according to claim 9, wherein said anion is selected from the following: trifluoromethane sulphonate $CF_3SO_3^-$ ion, trifluoroacetate ion $CF_3COO^-$ ion, tris-(trifluoromethane sulphone) carbide ion $(CF_3SO_2)_3^-$.

11. An electrolyte according to claim 5, wherein said electrolyte is diluted in at least one solvent.

12. An electrolyte according to claim 11, wherein said solvent is selected from water and the following components: ethanol, butanol, acetonitrile, butyronitrile, tetramethylurea, 3-methyl-2-oxazolidinone, 1,3-dimethyl-3,4,5,6-tetrahydro-2(1H)-pyrimidone, dimethylimidazolidinone and 1-methyl-2-pyrolidone, dimethyl-sulphoxide, sulpholane, higher ketones, and mixtures of at least two of these components.

13. An electrolyte according to claim 4, wherein the cation of said electrochemically active salt consists of at least one group comprising at least one quaternary nitrogen.

14. An electrolyte according to claim 13, wherein said group comprising at least one quaternary nitrogen is selected from imidazolium and triazolium type groups, corresponding to the following general formulae:

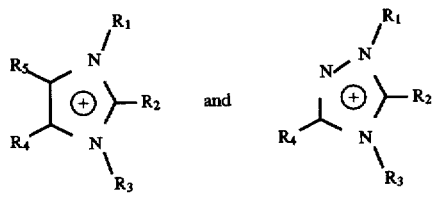

in which the groups $R_1$ and $R_3$ are identical or different and are selected from linear or branched alkyl groups having 1 to 20 atoms of carbon, linear or branched alkoxy groups having 1 to 20 atoms of carbon, fluoride substitution derivatives of alkyl groups having 1 to 20 atoms of carbon, alkenyl groups, alkinyl groups, and combinations of these groups and the corresponding halogenides, or from alkoxyalkyl and polyether groups; and in which the groups $R_2$, $R_4$ and $R_5$ are identical or different and are selected from hydrogen, linear or branched alkyl groups having 1 to 20 atoms of carbon, linear or branched alkoxy groups having 1 to 20 atoms of carbon, fluoride substitution derivatives of alkyl groups having 1 to 20 atoms of carbon, alkenyl groups, alkinyl groups, and combinations of these groups and the corresponding halogenides, or from alkoxyalkyl and polyether groups.

15. An electrolyte according to claim 4, wherein the cation of said electrochemically active salt consists of at least one group comprising a ternary sulphur atom.

16. An electrolyte according to claim 4, wherein the anion of said electrochemically active salt is a halide ion.

17. An electrolyte according to claim 4, wherein the anion of the said electrochemically active salt is a polyhalide ion.

18. An electrolyte according to claim 4, wherein the anion of said electrochemically active salt is a complex anion containing at least one halide.

19. An electrolyte according to claim 4, wherein said electrolyte is diluted in at least one solvent.

20. An electrolyte according to claim 19, wherein said solvent is selected from water and the following components: ethanol, butanol, acetonitrile, butyronitrile, tetramethylurea, 3-methyl-2-oxazolidinone, 1,3-dimethyl-3,4,5,6-tetrahydro-2(1H)-pyrimidone, dimethylimidazolidinone and 1-methyl-2-pyrolidone, dimethyl-sulphoxide, sulpholane, higher ketones and mixtures of at least two of these components.

21. An electrolyte according to claim 4, wherein said electrolyte comprises as said electrochemically active salt at least one salt capable of crystallizing to solid state at ambient temperature but forming a liquid phase at this temperature in the presence of said at least one molecule.

22. An electrolyte according to claim 4, wherein said oxidation reduction system comprises at least two salts, each having a melting point below ambient temperature, the anions of which forming a couple of two different halides.

23. An electrolyte according to claim 22, wherein said couple of halides is the iodide/bromide couple.

24. An electrolyte according to claim 4, wherein said oxidation reduction system comprises at least two electrochemically active salts and wherein said electrolyte is dissolved in at least one electrochemically inactive salt having a melting point below ambient temperature.

* * * * *

UNITED STATES PATENT AND TRADEMARK OFFICE
CERTIFICATE OF CORRECTION

PATENT NO : 5,728,487
DATED : March 17, 1998
INVENTOR(S): Michael Graetzel; Yordan Athanassov; Pierre Bonhote It is certified that error appears in the above-identified patent and that said Letters Patent is hereby corrected as shown below:

At column 6, line 23, please delete "15 to 8" and insert in lieu thereof --15, 6, 7, and 8--.

Signed and Sealed this

Twenty-fourth Day of November, 1998

Attest:

BRUCE LEHMAN

Attesting Officer

Commissioner of Patents and Trademarks